US010970206B2

(12) United States Patent
Lu et al.

(10) Patent No.: US 10,970,206 B2
(45) Date of Patent: Apr. 6, 2021

(54) FLASH DATA COMPRESSION DECOMPRESSION METHOD AND APPARATUS

(71) Applicant: Intel Corporation, Santa Clara, CA (US)

(72) Inventors: Fumin Lu, Shanghai (CN); Yufu Li, Shanghai (CN); Peng Wang, Shanghai (CN); Xiaoguo Liang, Shanghai (CN); Ye Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,207

(22) PCT Filed: Mar. 16, 2017

(86) PCT No.: PCT/CN2017/076906
§ 371 (c)(1),
(2) Date: Jun. 24, 2019

(87) PCT Pub. No.: WO2018/165939
PCT Pub. Date: Sep. 20, 2018

(65) Prior Publication Data
US 2019/0347194 A1    Nov. 14, 2019

(51) Int. Cl.
*G06F 12/02* (2006.01)

(52) U.S. Cl.
CPC .. *G06F 12/0246* (2013.01); *G06F 2212/1044* (2013.01); *G06F 2212/1056* (2013.01); *G06F 2212/401* (2013.01); *G06F 2212/7202* (2013.01)

(58) Field of Classification Search
CPC .. G06F 3/0679; G06F 3/0688; G06F 12/0246; G06F 2212/401
See application file for complete search history.

(56) References Cited

U.S. PATENT DOCUMENTS 7,907,069 B2 *   3/2011   Oberdorfer ............. H03M 7/30
                                                  341/55
2009/0031074 A1   1/2009   Son
(Continued)

FOREIGN PATENT DOCUMENTS

| CN | 101390063 A | 3/2009 |
|----|-------------|--------|
| CN | 102063936 A | 5/2011 |
| CN | 103020317 A | 4/2013 |

OTHER PUBLICATIONS

Kjelsø et al. "Design and Performance of a Main Memory Hardware Data Compressor." 1996. IEEE. EUROMICRO-22. pp. 423-430.*
(Continued)

*Primary Examiner* — Nathan Sadler
(74) *Attorney, Agent, or Firm* — Schwabe, Williamson & Wyatt, P.C.

(57) ABSTRACT

Methods, apparatus, and system to compress a data file to form a compressed data file. The data file may be used to configure control of hardware, such as peripheral hardware. The compressed data file may be stored locally or transmitted to another computer device. The compressed data file may be stored in a flash memory. The compressed data file may require less space in flash memory components, relative to flash memory suitable to hold the (original, pre-compressed) data file. Compression and/or decompression may be performed by, for example, a flash memory controller. The compressed data file may be decompressed dynamically, on an as-needed basis, to provide code for execution by a processor and/or to configure a computer device to use hardware or other components. Other software and hardware components do not need to be aware that the data file is compressed in the flash memory.

25 Claims, 7 Drawing Sheets

(56) References Cited

U.S. PATENT DOCUMENTS

| | | | |
|---|---|---|---|
| 2009/0150599 A1* | 6/2009 | Bennett | G06F 12/0246 |
| | | | 711/103 |
| 2011/0145486 A1 | 6/2011 | Owa et al. | |
| 2011/0161559 A1* | 6/2011 | Yurzola | G06F 3/0679 |
| | | | 711/103 |
| 2011/0202709 A1* | 8/2011 | Rychlik | G06F 3/0679 |
| | | | 711/103 |
| 2015/0339237 A1* | 11/2015 | Heddes | G06F 12/1009 |
| | | | 711/137 |
| 2017/0097773 A1* | 4/2017 | Camp | G06F 3/0608 |
| 2018/0024748 A1* | 1/2018 | Hahn | G06F 3/0661 |
| | | | 711/154 |

OTHER PUBLICATIONS

Larsson et al. "Offline Dictionary-Based Compression." 1999. IEEE. DCC'99.*

Dgien et al. "Compression Architecture for Bit-write Reduction in Non-volatile Memory Technologies." 2014. IEEE. NANOARCH 2014. pp. 51-56.*

International Search Report and Written Opinion dated Dec. 21, 2017 for International Patent Application No. PCT/CN2017/076906, 11 pages.

\* cited by examiner

FLASH DATA COMPRESSION DECOMPRESSION METHOD AND APPARATUS

CROSS REFERENCE TO RELATED APPLICATIONS

The present application is a national phase entry under 35 U.S.C. § 371 of International Application No. PCT/CN2017/076906, filed Mar. 16, 2017, entitled "FLASH DATA COMPRESSION DECOMPRESSION METHOD AND APPARATUS", which designated, among the various States, the United States of America. The Specifications of the PCT/CN2017/076906 Application is hereby incorporated by reference.

FIELD

The present disclosure relates to the field of computing, in particular to compression and/or decompression of a data stored or to be stored on a flash memory.

BACKGROUND

A compiled executable software program or code may be provided to a computer for execution in the form of executable program code, also referred to as a program image or data file. Code of certain data files, such as data files which configure the computer to use hardware, such as peripherals, may be loaded into flash memory. Loading the data file into flash memory (and subsequently retrieving selective portions of the data file) may be performed, for example, by a serial peripheral interface controller of a platform control hub.

While flash memory is generally non-volatile, flash memory in a computer often has limited capacity. Different types of flash memory exhibit different read/write characteristics, and it costs money to include flash memory in a computer. Additionally, flash memory occupies space on a chipset, and there may be an upper limit on the number of times different types of flash memory can reliably be re-written. Further, time is required to read, write, and erase data in flash memory. As a result, inefficient use of flash memory can result in, for example, increases in cost and increases in chip and/or chipset size.

Software compression of data stored in flash memory can allow more data to be stored in a smaller flash memory footprint, but may result in slower execution of code, as the data must be compressed and decompressed by a processing unit as it goes to and comes off of flash memory. Software compression of data stored in flash memory may also be incompatible with use of the flash memory to hold hardware configuration data files, as a processor and a memory comprising a corresponding software decompression algorithm execution must be initialized before hardware controlled by the data file can be initialized.

Including compression/decompression hardware in flash memory components can result in increased hardware costs, can increase the size of flash memory components, decreases design flexibility, and can increase the size of a chipset.

Figure 1:
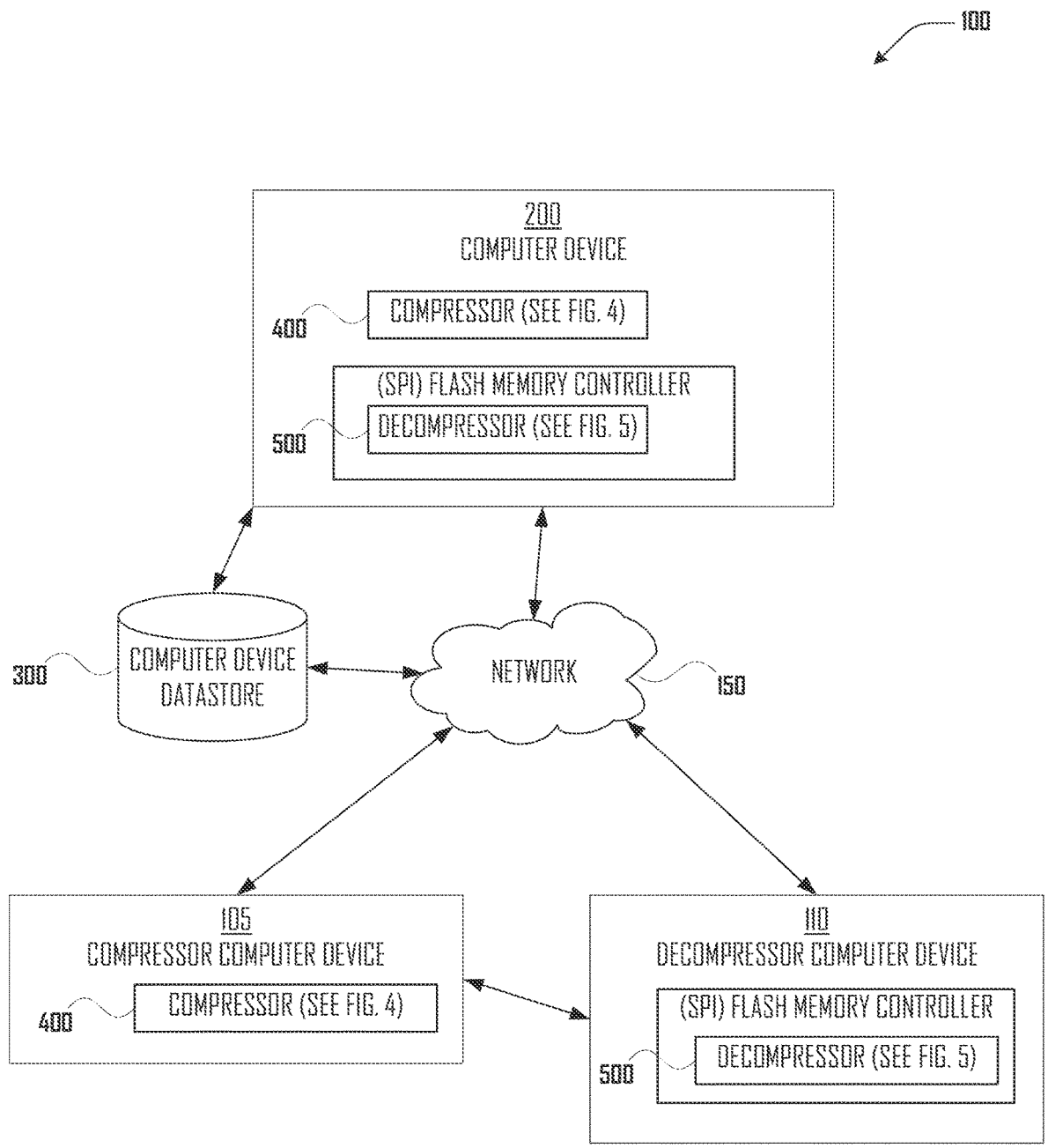
FIG. 1 is a network and device diagram illustrating an example of computer devices in a network environment incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

In overview, this disclosure relates to methods and systems in a computer device apparatus to compress a data file to form a compressed data file and/or to decompress the compressed data file. The data file may be used to configure control of hardware, such as peripheral hardware. The compressed data file may be stored locally or transmitted to another computer device. The compressed data file may be stored in a flash memory, such as, for example a NOR flash memory. The compressed data file may require a smaller flash memory component, relative to flash memory suitable to hold the (original, pre-compressed) data file. The compressed data file may be compressed and/or decompressed using, for example, a flash memory controller. The compressed data file may be decompressed dynamically, on an as-needed basis, to provide code for execution by a processor and/or to configure hardware or other components. Other software and hardware components do not need to be aware that the data file is compressed in the flash memory.

Many page blocks in a data file, such as in a serial peripheral interface or other hardware interface data file, may comprise a pattern, such as 0xFF, 0x00, or others. A data file compressor or compressor, may read page blocks of the data file, determine or obtain a pattern found in at least one of the page blocks, and store the pattern, such as in a header of a compression table. The compressor may read page blocks of the data file, determine whether the pattern is identified in relation to a then-current page block, and store an indicator regarding whether the pattern is identified in relation to the then-current page block. As set of the indicators may be stored in, for example, a compression map of the compression table. When the pattern is not identified, the compressor may store the then-current uncompressed page block in a set of uncompressed page blocks. When the pattern is identified with respect to a then-current page block, the then-current page block may not be stored in the set of uncompressed page blocks (and be removed from the set of uncompressed page blocks instead). The compressor may combine the compression table (with its compression map with set of indicators and with its header and stored pattern) and the set of remaining uncompressed page blocks in a compressed data file. The compressed data file may then be stored. The compressed data file may be transmitted to another computer device also.

A data decompressor at a computer device may receive or obtain a compressed data file corresponding to a data file, prepared as described above. The decompressor may be part of or incorporated into a flash memory controller, such as a flash memory controller to control a flash memory, and thus receive or obtain the compressed data file as part of a request to store the compressed data file into the flash memory controlled by the flash memory controller. The flash memory may be, for example, a NOR flash memory. The flash memory controller may control a serial peripheral interface. The decompressor may load the compression table of the compressed data file into the flash memory controller.

The decompressor may decode the compression map and read a page block size from the header of the compression table, in response to a request to retrieve a portion of the data file. For each page block of the data file, according to the compression map, the decompressor may read a corresponding indicator from a set of indicators in a map of the compression table, such as a bitmap. If the indicator indicates that data of a then-current page block may be obtained from a pattern, the decompressor may obtain the pattern from the header and output the pattern as the requested page block. If the indicator indicates that the data of the then-current page block is not compressed, then the decompressor may obtain a corresponding uncompressed page block from a set of uncompressed page blocks in the compressed data file and output the corresponding uncompressed page block. Output of the pattern and/or uncompressed page block may be to a processor, such as in response to a request for code to configure the processor to control a peripheral, to interact with another process, or the like.

In this way, the compressor may compress a data file into a set of uncompressed page blocks and a compression map, wherein the compression map indicates whether page blocks in an uncompressed version of the data file are to be obtained according to a pattern or from an uncompressed page block in the set of uncompressed page blocks. The compressed data file may be stored in a flash memory, such as, for example a NOR flash memory, and/or may be transmitted to another computer device. The compressed data file may require a smaller flash memory component, relative to flash memory suitable to hold the (original, pre-compressed) data file. The compressed data file may be compressed and/or decompressed using, for example, a flash memory controller. The compressed data file may be decompressed dynamically, on an as-needed basis, to provide code for execution by a processor and/or to configure hardware or other components. A corresponding decompressor may decompress a compressed data file by reading the compression map and the set of uncompressed page blocks and by outputting either an uncompressed page block from the set of uncompressed page blocks or a pattern. Software processes and hardware components do not need to be aware that the data file is compressed in the flash memory.

FIG. 1 is a network and device diagram illustrating an example of at least one computer device 200, computer device datastore 300, network 150, compressor computer device 105, and decompressor computer device 110, incorporated with the teachings of the present disclosure, according to some embodiments. In embodiments, computer device 200 may include both compressor 400 and decompressor 500 of the present disclosure (to be described more fully below). In embodiments, compressor computer device 105 may include compressor 400. In embodiments, decompressor computer device 110 may include decompressor 500. As illustrated in FIG. 1, compressor 400 and decompressor 500 may be in one computer device or may be in more than one computer device, including in separate and distinct computer devices.

Computer device 200, except for the teachings of the present disclosure, may include, but is not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer, a virtual reality display or supporting computers therefore, a mobile telephone including, but not limited to a smart phone, (e.g., iPhone®, Android®-based phone, Blackberry®, Symbian®-based phone, Palm®-based phone, etc.), a feature phone, or any computer device comprising a flash memory and a flash memory controller.

Also illustrated in FIG. 1 is computer device datastore 300. Computer device datastore 300 is described further, herein, though, generally, it should be understood as a datastore used by computer device 200. Components of computer device datastore 300 may be included in compressor computer device 105 and/or decompressor computer device 110. Computer device datastore 300 is discussed further in relation to FIG. 3.

Also illustrated in FIG. 1 is network 150. Network 150 may comprise computers, switches, routers, gateways, network connections among the computers, and software routines to enable communication between the computers over the network connections. Examples of Network 150 comprise wired networks, such as an Ethernet networks, and/or a wireless networks, such as a WiFi, GSM, TDMA, CDMA, EDGE, HSPA, LTE or other network provided by a wireless service provider; local and/or wide area; private and/or public, such as the Internet. More than one network may be involved in a communication session between the illustrated devices. Connection to Network 150 may require that the computers execute software routines which enable, for example, the seven layers of the OSI model of computer networking or equivalent in a wireless phone network.

Figure 2:
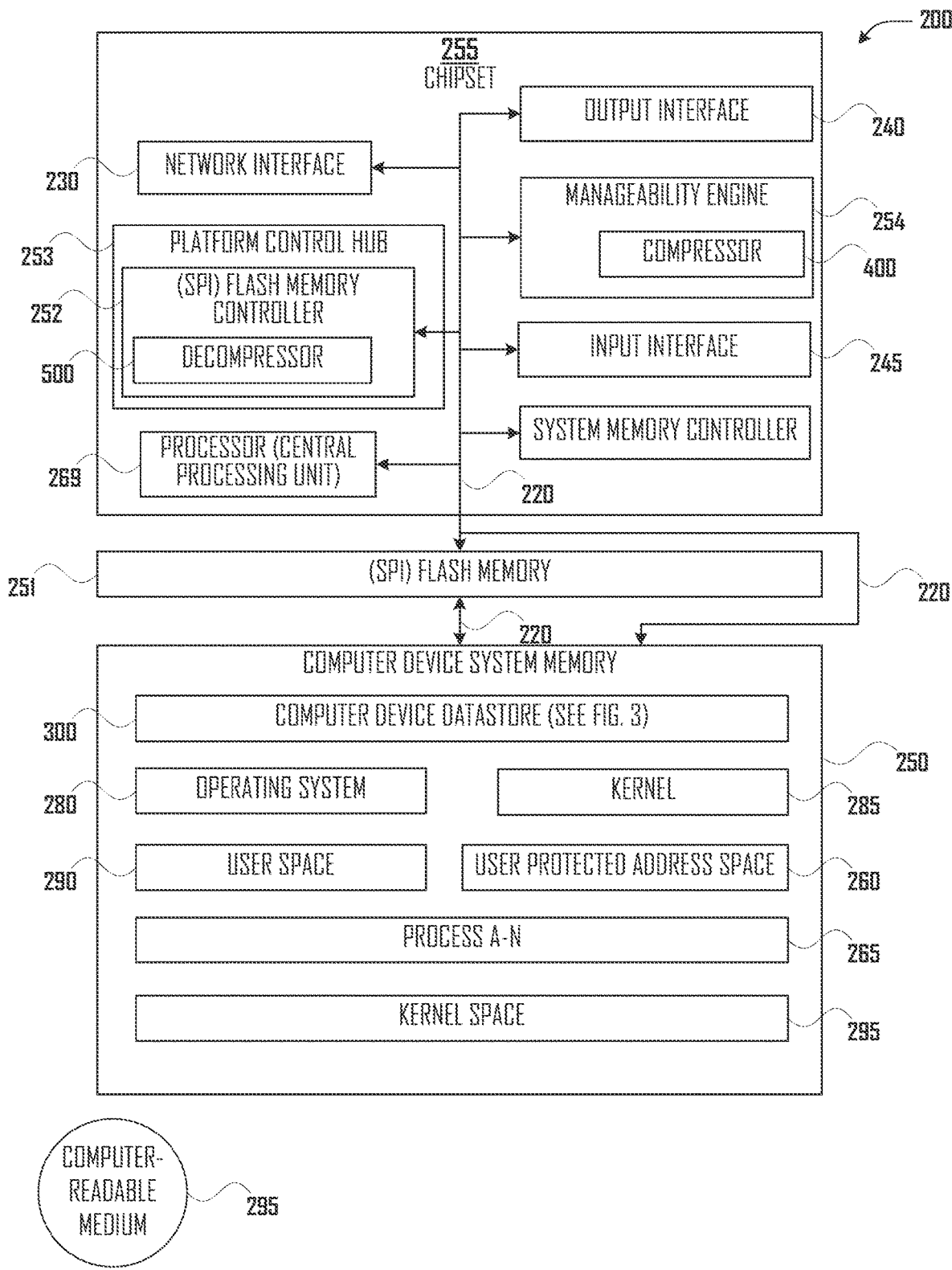
FIG. 2 is a block diagram illustrating an example of a computer device incorporated with teachings of the present disclosure, according to some embodiments.

FIG. 2 is a functional block diagram illustrating an example of computer device 200 incorporated with the teachings of the present disclosure, according to some embodiments. Compressor computer device 105 and/or decompressor computer device 110 may be understood as equivalent to computer device 200.

Computer device 200 may include chipset 255, computer device system memory 250, and flash memory 251, all interconnected via bus 220.

Chipset 255 may comprise platform control hub 253, flash memory controller 252, processor 269, input/output (I/O) port(s) and peripheral device interfaces, such as output interface 240 and input interface 245, network interface 230, manageability engine 254. Network Interface 230 may be utilized to couple processor 269 to a network interface card (NIC) to form connections with network 150, with computer device datastore 300, or to form device-to-device connections with other computers.

Chipset 255 may include a peripheral or platform control hub (PCH) 253. PCH 253 may include flash memory controller 252. Flash memory controller 252 may be separate from a PCH (PCH may not be present). Flash memory controller 252 may be used to control flash memory, such as flash memory 251, which may be used in relation to a serial peripheral interface ("SPI"), a device driver, a boot loader, a kernel or the like. Flash memory 251 may be or comprise, for example, a NAND flash memory and/or a NOR flash memory. In relation to an SPI, flash memory 251 may be or comprise a NOR flash memory. Flash memory controller 252 may be an SPI flash memory controller.

Chipset 255 may include manageability engine 254. Manageability engine 254 may be an ASIC, FPGA, or the like. Manageability engine 254 may comprise logic, program code, firmware, instructions, and/or algorithmic structure for modules, processes, or routines, such as, for example, and compressor 400 (illustrated and discussed further in relation to FIG. 4).

Figure 5:
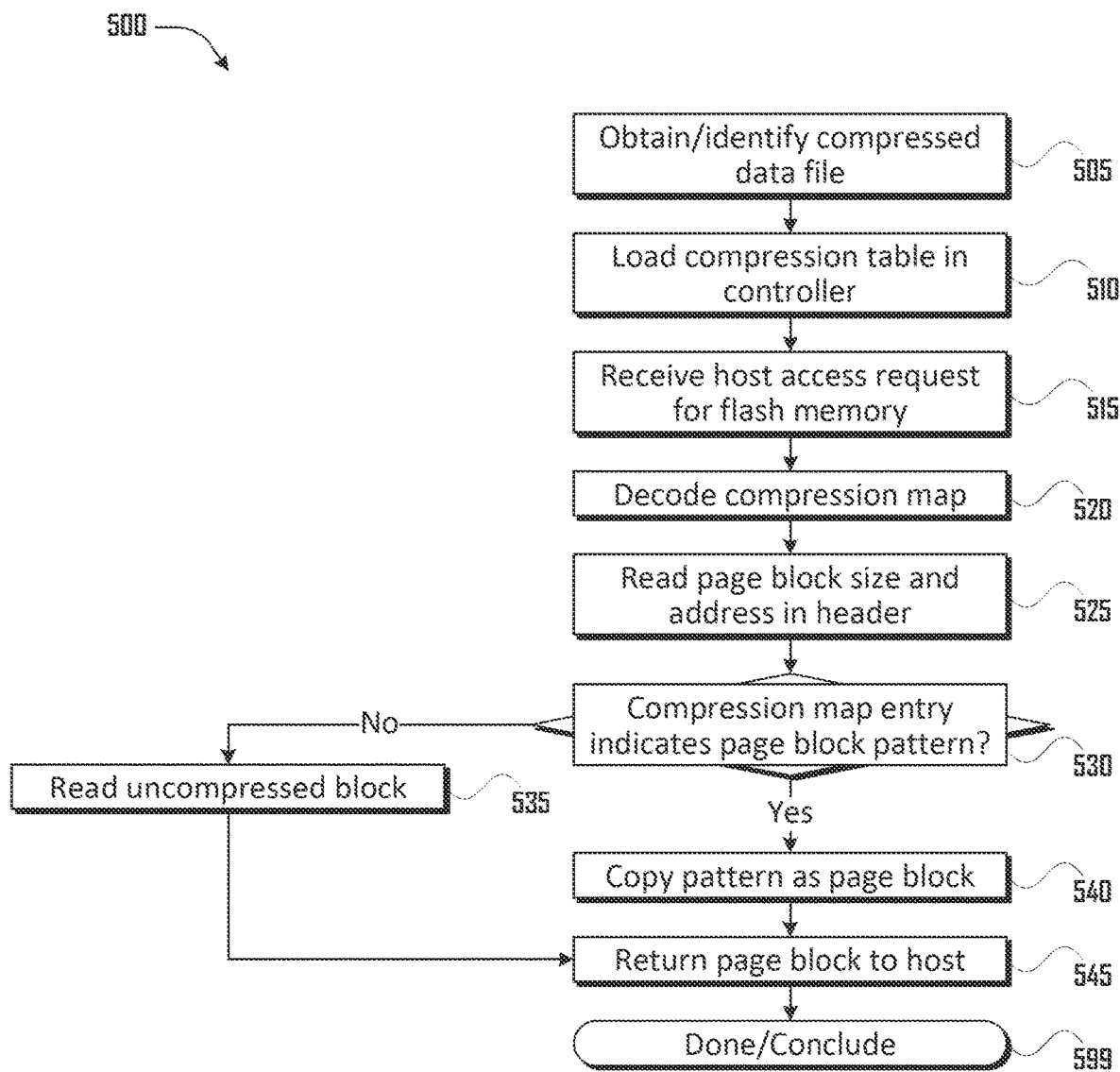
FIG. 5 is a flow diagram illustrating an example of a method performed by and/or algorithmic structure of a decompressor, according to some embodiments.

Flash memory controller 252 may store logic, program code, firmware, or instructions for modules, processes, or routines, such as, for example, decompressor 500 (illustrated and discussed further in relation to FIG. 5).

In another example, chipset 255 may include a sensors hub (not illustrated).

Chipset 255 may include communication components and/or paths, e.g., buses 220, that couple processor 269 to peripheral devices, such as, for example, output interface 240 and input interface 245, which may be connected via I/O ports. Computer device 200 may communicate via bus 220 and/or network interface 230 with computer device datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology.

Input interface 245 and output interface 240 may couple processor 269 to input and/or output devices that include, for example, user and machine interface device(s) including a display, a touch-screen display, printer, keypad, keyboard, etc., sensor(s) including inertial measurement unit, camera, global positioning system (GPS), etc., storage device(s) including hard disk drives, solid-state drives (including flash memory 251), removable storage media, etc. I/O ports for input interface 245 and output interface 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Processor 269 may include one or more execution core(s), which may be central processing units ("CPUs") and/or graphics processing units ("GPUs") one or more registers, and one or more cache memor(ies). Processor 269 may include a memory management unit (MMU) to manage memory accesses between processor 269 and computer device system memory 250. In some embodiments, processor 269 may be configured as one or more socket(s); each socket may include one or more core(s), a plurality of registers and one or more cache memor(ies). Each core may be configured to execute one or more process(es) 265 and/or one or more thread(s). A plurality of registers may include a plurality of general purpose registers, a status register and an instruction pointer.

Computer device system memory 250 may generally comprise a random access memory ("RAM"), a read only memory ("ROM"), and a permanent mass storage device, such as a disk drive or SDRAM (synchronous dynamic random-access memory). In some embodiments, computer device system memory 250 may include or be considered to include flash memory, such as flash memory 251. Flash memory 251 may be illustrated here as a separate component for the sake of descriptive convenience.

Computer device system memory 250 may store program code for software modules, processes, routines, or algorithmic structures as well as kernel 285 and operating system 280. Such components may call or require code for a peripheral or another component, such as code of flash memory 251 and/or flash memory controller 252.

Computer device system memory 250 may also store operating system 280. These software components may be loaded from a non-transient computer readable storage medium 295 into computer device system memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
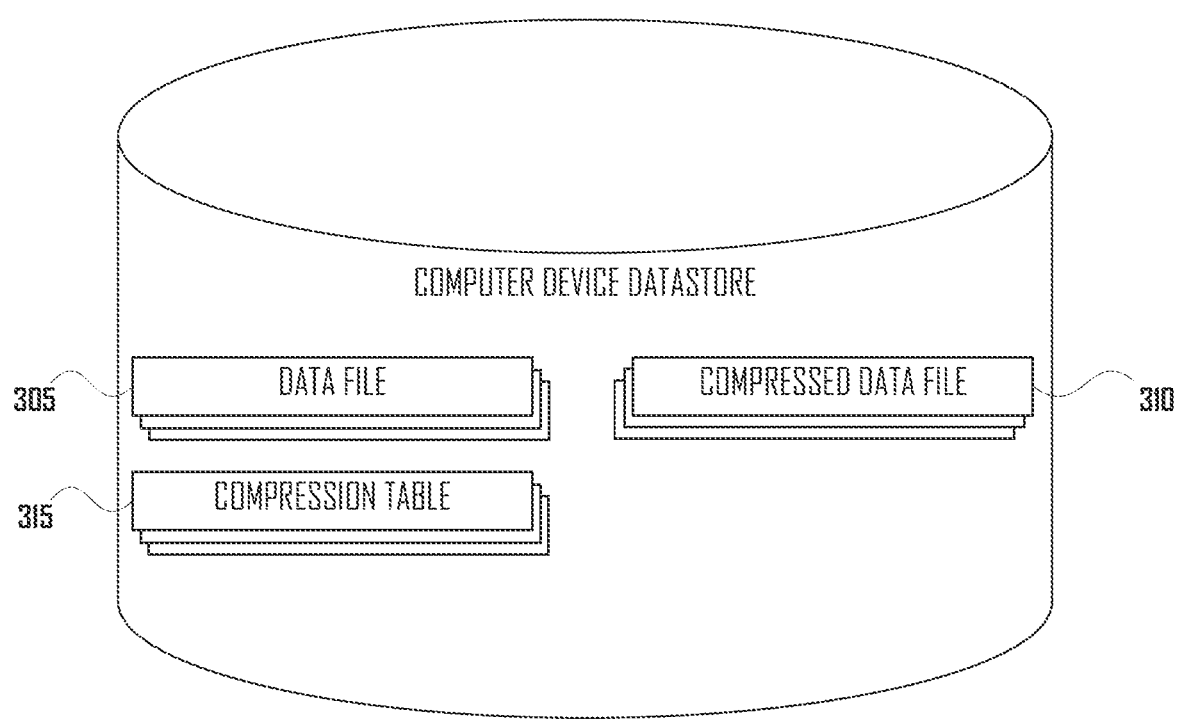
FIG. 3 is a block diagram illustrating an example of a computer device datastore for practicing the present disclosure, consistent with embodiments of the present disclosure.

Computer device system memory 250 is also illustrated as comprising kernel 285, kernel space 295, user space 290, user protected address space 260, and computer device datastore 300 (illustrated and discussed further in relation to FIG. 3).

Computer device system memory 250 may store one or more process 265 (i.e., executing software application(s)). Process 265 may be stored in user space 290. Process 265 may include one or more other process 265*a* . . . 265*n*. One or more process 265 may execute generally in parallel, i.e., as a plurality of processes and/or a plurality of threads.

Computer device system memory 250 is further illustrated as storing operating system 280 and/or kernel 285. The operating system 280 and/or kernel 285 may be stored in kernel space 295. In some embodiments, operating system 280 may include kernel 285. One or more process 265 may be unable to directly access kernel space 295. In other words, operating system 280 and/or kernel 285 may attempt to protect kernel space 295 and prevent access by one or more process 265*a* . . . 265*n*.

Kernel 285 may be configured to provide an interface between user processes and circuitry associated with computer device 200. In other words, kernel 285 may be configured to manage access to processor 269, chipset 255, I/O ports and peripheral devices by process 265. Kernel 285 may include one or more drivers configured to manage and/or communicate with elements of computer device 200 (i.e., processor 269, chipset 255, I/O ports and peripheral devices).

Kernel 285 and/or operating system 280 may make calls to processor 269 and/or flash memory controller 252 to store, access, delete, and/or modify records in flash memory 251, such as to configure hardware of computer device 200 to be used by kernel 285 and operating system 280.

Computer device 200 may, in some embodiments, include many more components than as illustrated. However, it is not necessary that all components be shown in order to disclose an illustrative embodiment. In alternate embodiments, operating system 280 may include a software implementation of compressor 400 instead.

FIG. 3 is a functional block diagram of the computer device datastore 300 illustrated in the computer device of FIG. 2, according to some embodiments. Computer device datastore 300 may comprise multiple datastores in and/or remote with respect to computer device 200. Datastore 300 may be distributed. The components of computer device datastore 300 may include data groups used by modules and/or routines, e.g, data file 305, compressed data file 310, and compression table 315 (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of computer datastore 300 are discussed further herein in the discussion of other of the Figures. In overview, a data file 305 record is a data file, including a data file containing executable program code. In overview, a compressed data file 310 is a compressed data file prepared as described herein. A compression table 315 is the table having the compression map and page block pattern(s) associated with the compressed data file 310.

Figure 4:
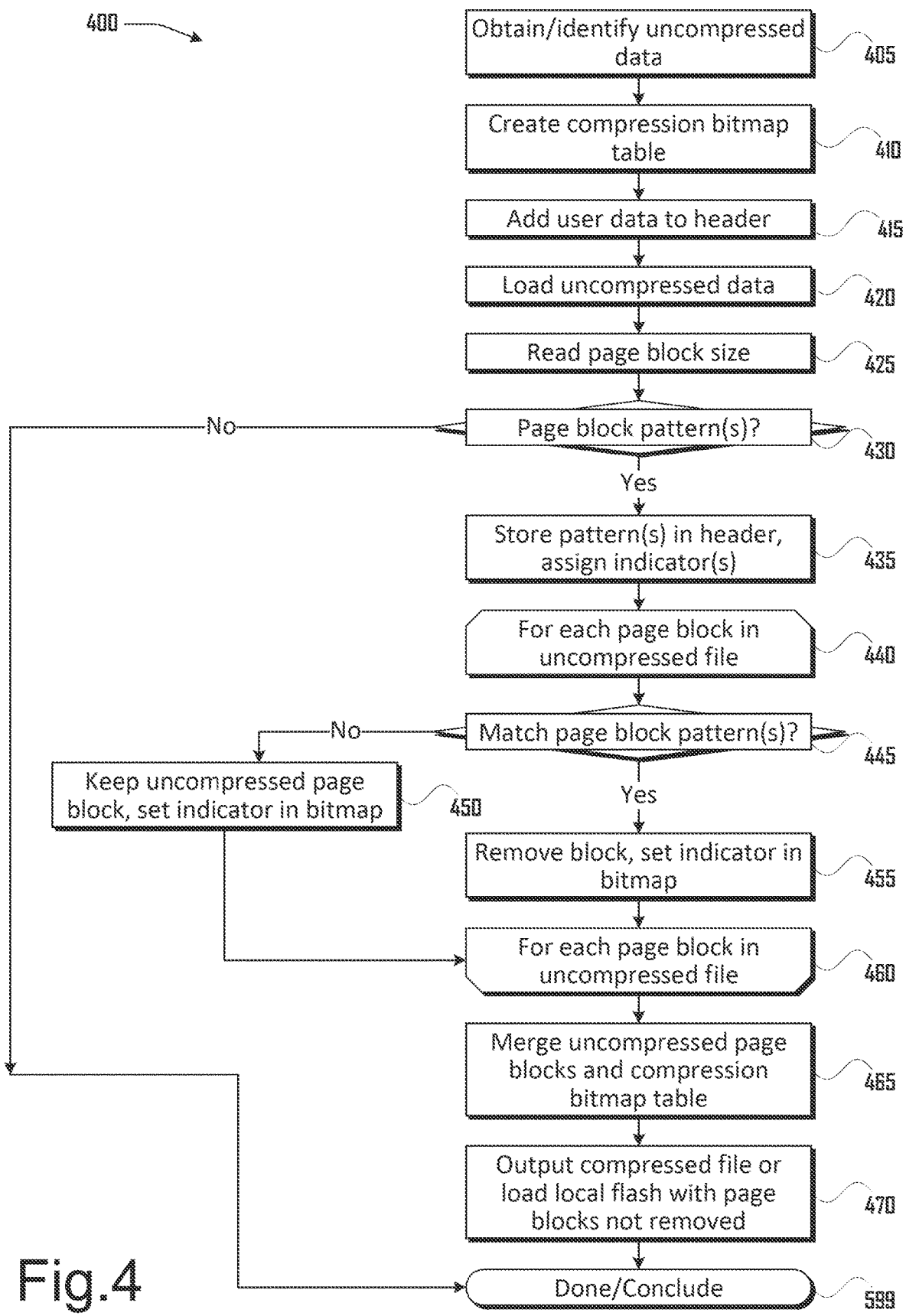
FIG. 4 is a flow diagram illustrating an example of a method performed by and/or algorithmic structure of a compressor, according to some embodiments.

FIG. 4 is a flow diagram illustrating an example of a method performed by and/or algorithmic structure of compressor 400, according to some embodiments. Compressor 400 may be implemented within, for example, computer device 200 and/or compressor computer device 105. Code, logic, and/or instructions for compressor 400 may be in and implemented by, for example, manageability engine 254, which may be a serial peripheral interface flash memory controller.

At block 405, compressor 400 may obtain or identify a data file, such as one or more data file 305 records. Prior to obtaining or identifying the data file, compressor 400 may be explicitly or implicitly instructed to compress the data file, either for local use or for transmission to another computer device.

At block 410, compressor 400 may create a compression table (including a template or "blank" compression table, to be completed by compressor 400) for data file of block 405. Records of or for the compression table may be stored in flash memory controller 252, manageability engine 254, and/or computer device datastore 300 as, for example, one or more compression table 315 records. A description of a compression table is provided further in relation to FIG. 7. In overview, the compression table may comprise a header and a compression map.

At block 415, compressor 400 may receive or obtain user data and add such user data to the header of the compression table. The user data may comprise, for example, a signature, a globally unique identifier ("GUID"), a version, a flash size, and a page size for the data file.

At block 420, compressor 400 may load the (uncompressed, original) data file of block 405 into memory, such as computer device system memory 250, a memory of flash memory controller 252, or the like. At block 425, compressor 400 may read a page block size of the data file from the loaded data file. This information may or may not have been part of user data—if not part of user data, the page block size may be read from page block(s) in the loaded data file and may be stored in the header at this block.

At decision block 430, compressor 400 may determine whether one or more page block pattern(s) are present in page blocks of the data file. The determination may be based on information provided as a user setting, such as with a user selection or designation which defines the pattern(s). The determination may be based on a comparison of page blocks in the data file.

If affirmative or equivalent at decision block 430, at block 435 may store the pattern(s) in the header of the compression table and may assign an indicator(s) to the pattern(s), such as a zero or one or the like.

Opening loop block 440 to closing loop block 460 may iterate over each page block in the (original, uncompressed) data file.

At decision block 445, compressor 400 may determine whether a then-current page block matches the pattern(s) in the header of the compression table.

If negative or equivalent at decision block 445, compressor 400 may keep the then-current, uncompressed, page block (also referred to herein as a "retained page block") and set an indicator that the then-current page block is uncompressed. The indicator may be stored, for example, in a compression map of the compression table. The indicator may be, for example, a binary "0" or "1", wherein one of the two binary options indicates an uncompressed page block and the other indicates a compressed page block, wherein the compressed page block is to be supplied from or according to the pattern in the header. For more than one pattern, the indicator may indicate which of the more than one pattern the then-current page block corresponds to. Compressor 400 may add the then-current page block to a set of uncompressed page blocks of or for the data file.

If affirmative or equivalent at decision block 445, at block 455 compressor 400 may remove the then-current page block or may not store the then-current page block in the set of uncompressed page blocks; such page block may be referred to herein as a "removed page block". At block 455, compressor may also set the indicator for the then-current page block to indicate that the page block corresponds to the pattern in the header.

Upon conclusion of processing the page blocks of the data file, compressor 400 has compression table and a set of uncompressed page blocks (retained page blocks). A header of the compression table may comprise the user data, pattern(s) in or of the uncompressed page blocks, and a set of indicators in a compression map. There may, for example, be one indicator for each page block in the (original, uncompressed) data file.

At block 465, compressor 400 may merge the set of uncompressed page blocks with the compression table. At block 470, may output the merged result as a compressed data file and/or may store the retained page blocks in flash memory 251. The compressed data file may be stored in, for example, in computer device datastore 300 as one or more compressed data file 310 records. Compressed data file 310 record(s) may be transmitted to another computer device, such as to decompressor computer device 110.

If negative or equivalent at decision block 430 or following block 470, compressor 400 may conclude, return, such as to block 405, and/or may return to another process, routine, or module which may have invoked compressor 400.

FIG. 5 is a flow diagram illustrating an example of a method performed by and/or algorithmic structure of flash memory controller 252, including decompressor 500, according to some embodiments. Flash memory controller 252/Decompressor 500 may be implemented by, for example, computer device 200 and/or decompressor computer device 110. Code, logic, and/or instructions for flash memory controller 252/decompressor 500 may be in and implemented by, for example, decompressor computer device 110. Flash memory controller 252 may be a serial peripheral interface flash memory controller.

At block 505, flash memory controller 252 may obtain or identify a compressed data file, such as one or more compressed data file 310 record(s) in computer device datastore 300 (or the equivalent in or accessible by decompressor computer device 110). The compressed data file may correspond to a data file, such as an original uncompressed data file. The compressed data file 310 record(s) may be received or otherwise obtained from, for example, computer device 200 and/or compressor computer device 105. The compressed data file may comprise, for example, a compression table and a set of uncompressed page blocks (or retained page blocks). The compression table may comprise a header and a compression map. The header may comprise, for example, user information, a page size, and a pattern(s) of a page block in the (uncompressed, original) data file. The compression map may comprise a set of indicators, such as one for each page block of or in a (uncompressed, original) data file. The indicators may indicate whether the corresponding page block is found in the set of uncompressed page blocks or in a pattern(s). The indicators may be bits.

At block 510, flash memory controller 252 may load a compression table associated with the compressed data file into a control section of a flash memory controlled by flash memory controller 252.

At block 515, flash memory controller 252/decompressor 500 may receive a request by a host process, kernel, or operating system of the computer device of flash memory controller 252/decompressor 500 for code of a data file, such as a data file corresponding to the compressed data file.

At block 520, to service the request, decompressor 500 may decode a compression map from the compression table.

At block 525, decompressor may read a page block size and/or address for page blocks in the (uncompressed, original) data file, such as from the header.

At decision block 530, decompressor 500 may determine whether a then-current compression map entry, such as an indicator, indicates whether a then-current page block may be found in the set of uncompressed page blocks or whether it may be found in the pattern(s) in the header. The indicators stored in the compression map are discussed above, in relation to compressor 400.

If negative or equivalent at decision block 530, at block 535 decompressor 500 may read an uncompressed page block from the set of uncompressed page blocks. If affirmative or equivalent at decision block 530, at block 540 decompressor 500 may copy or read the pattern(s) from the header.

At block 545, decompressor 500 may return the uncompressed page block, obtained at block 535, or the pattern, obtained at block 540, to the host.

At done block 599, decompressor 500 may conclude and/or may return to another block, such as to block 505, and/or may return to a process which may have invoked decompressor 500.

Figure 6:
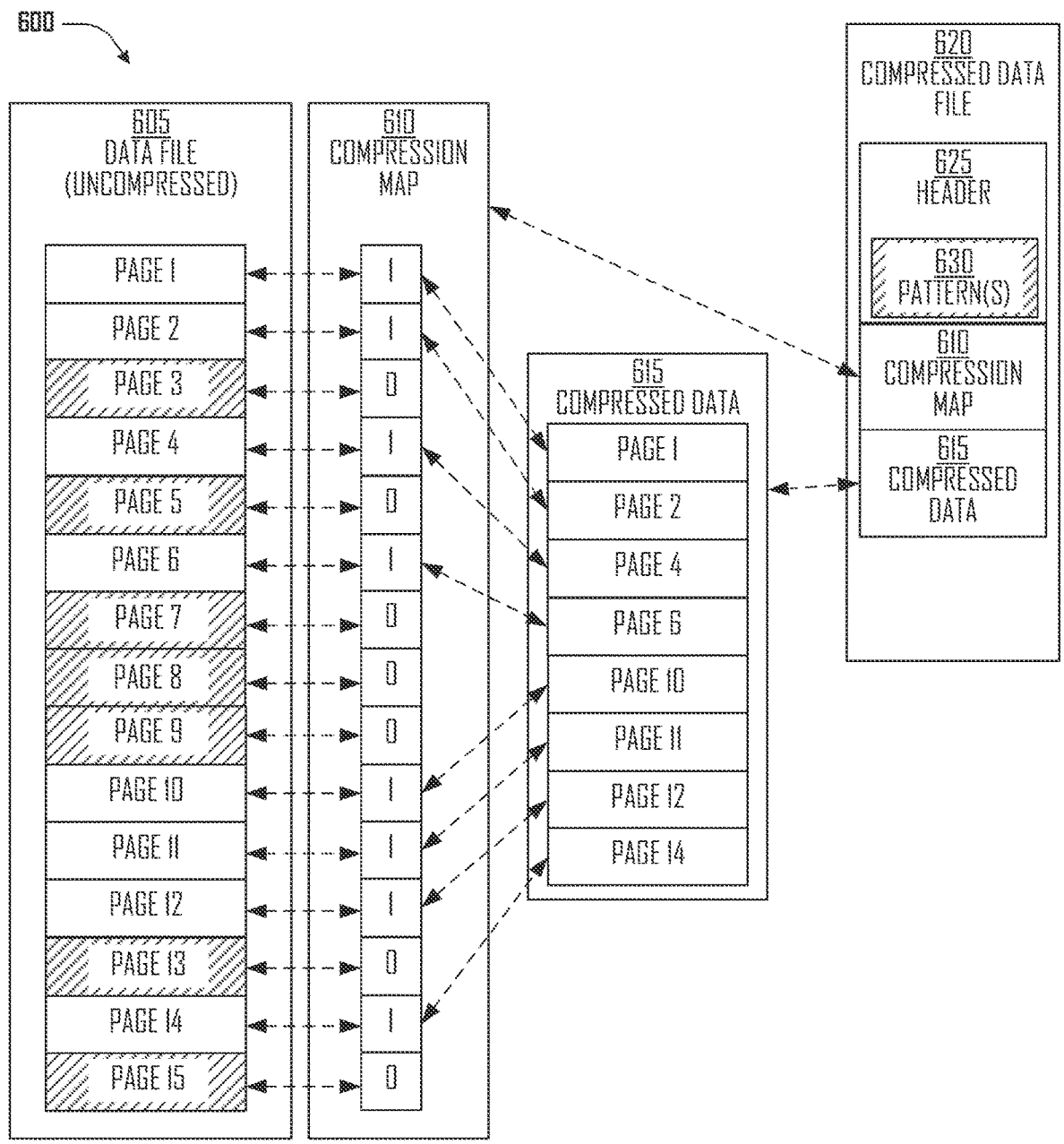
FIG. 6 is a diagram illustrating logical components of a data file, a compression map, compressed data, and a compressed data file, according to some embodiments.

FIG. 6 is a diagram 600 illustrating logical components of a data file 605, a compression map 610, compressed data 615, and a compressed data file 620, according to some embodiments.

FIG. 6 illustrates that (uncompressed, original) data file 605 may comprise a set of page blocks; in this example, page block 1 to page block 15. Data file 605 may be understood as equivalent to data file 305.

FIG. 6 illustrates compression map 610 as a list, table, array, or set of indicators. As illustrated in FIG. 6, each indicator is a binary indicator, though, as discussed elsewhere, the indicators may have greater depth, such as if they are used in relation to more than one pattern. As illustrated in FIG. 6, indicators of a "1" (or equivalent) in compression map 610 are created, such as by compressor 400, when the corresponding page block cannot or is not compressed. As illustrated in FIG. 6, indicators of a "0" (or equivalent) in compression map 610 are created, such as by compressor 400, when the corresponding page block can be found in pattern(s) in a header of a compression table.

As illustrated in FIG. 6, compressed data 615 comprises a set of uncompressed page blocks (or retained page blocks), which do not match a pattern(s) in the header of the compression table. This set of uncompressed page blocks may be assembled by, for example, compressor 400.

As illustrated in FIG. 6, compressed data file 620 may comprise a header 625. Header 625 may comprise pattern(s) 630, such as pattern(s) identified by or to compressor 400. Compressed data file 620 may further comprise compression map 610 and compressed data 615. Compressed data file 620 may be further compressed, such as during transmission to another computer device or for other purposes.

Figure 7:
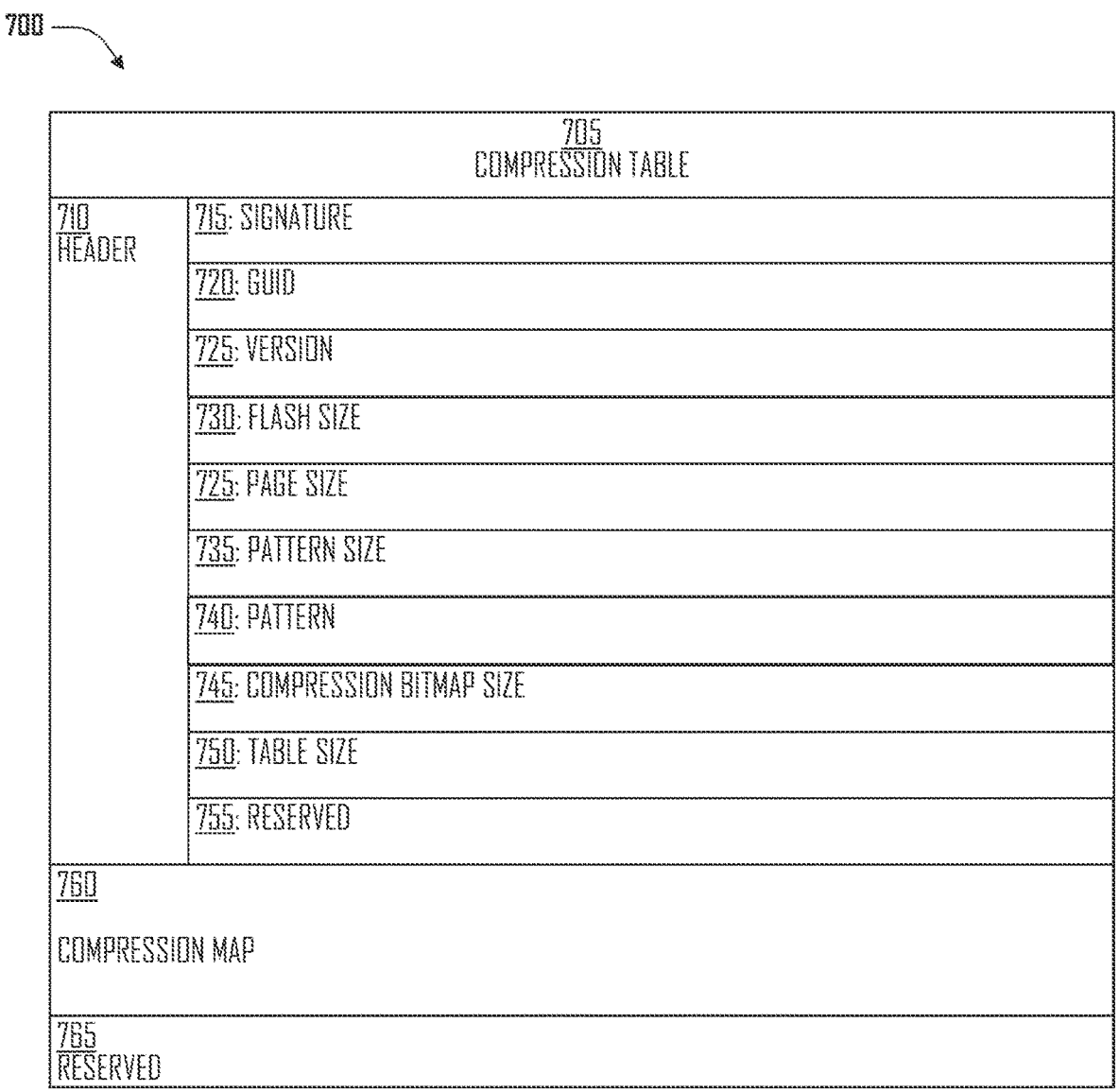
FIG. 7 is a diagram illustrating logical components of a compression table, according to some embodiments.

FIG. 7 is a diagram illustrating logical components of a compression table 705, according to some embodiments. Compression table 705 may be equivalent to, for example, compression table 315. Compression table 705 and components thereof may have been created by, for example, compressor 400 during compression of a data file into a compressed data file.

As illustrated in FIG. 7, compression table 705 may comprise header 710, compression map 760, and reserved portion 765.

Header 710 may comprise signature 715, which may be, for example a signature, hash, or the like of a data file and/or a compressed data file.

Header 710 may comprise globally unique identifier ("GUID") 720. GUID 720 may be, for example, an identifier of the data file compressed by compressor 400.

Header 710 may comprise version 725, which may be a version identifier with respect to the data file compressed by compressor 400, a compression table, or the like.

Header 710 may comprise flash size 730, which may be a flash size to be used in relation to the data file and/or the compressed data file. Flash size 730 may be used to define the length of, for example, a compression map length.

Header 710 may comprise page size 725, which may be a page size of page blocks in data file and/or compressed data file.

Header 710 may comprise one or more pattern size 735 records, which may be a size of a pattern in a set of page blocks, such as pattern 740.

Header 710 may comprise one or more pattern 740 records for pattern(s) in a set of page blocks.

Header 710 may comprise compression map size 745, which may be a size of a compression map of compression table.

Header 710 may comprise table size 750, which may be a size of compression table 705.

Header 710 may comprise reserved entry 755.

Compression map 760 may comprise a set of indicators. Indicators in the set of indicators may indicate to, for example, decompressor 500, whether a page block in an uncompressed data file is to be obtained from a set of uncompressed page blocks or from patterns) in header 710.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

Example 1. An apparatus for computing, comprising: a flash memory having a plurality of regions, each region to store a plurality of page blocks; a flash memory controller comprising a decompressor and a compression map and one or more page block patterns, wherein the compression map comprises a set of indicators, wherein indicators in the set of indicators denote whether a responsive page block corresponds to the one or more page block patterns or a page block in the plurality of page blocks; and wherein the decompressor is to receive a request for the responsive page block and return the responsive page block either from the one or more page block patterns or the page block in the plurality of page blocks, according to the compression map.

Example 2. The apparatus according to Example 1, wherein the responsive page block is to configure at least one of a serial peripheral interface, a device driver, a boot loader, or a kernel of a host system of the apparatus.

Example 3. The apparatus according to Example 1, wherein the compression map is a bit array, wherein bits in the bit array represent page blocks in an uncompressed version of the plurality of blocks and wherein bit values of the bits in the bit array are the indicators.

Example 4. The apparatus according to Example 1, wherein the flash memory controller is to load the compression map from a compressed data file into the flash memory controller and load the plurality of page blocks from the compressed data file into the flash memory.

Example 5. The apparatus according to Example 1, wherein the compression map is a compression map of a compression table and wherein the compression table further comprises a header, wherein the header comprises the one or more page block patterns, and an address and size of the responsive page block, and wherein the one or more page block patterns is a pattern of a page block removed from a superset of page blocks comprising the plurality of page blocks.

Example 6. The apparatus according to at least one of Example 1 to Example 5, wherein the flash memory is a NOR flash memory.

Example 7. The apparatus according to at least one of Example 1 to Example 5, wherein the flash memory controller is of a platform control hub.

Example 8. The apparatus according to at least one of Example 1 to Example 5, wherein the request is by a host system, kernel, or operating system of the apparatus.

Example 9. An apparatus for computing, comprising: a flash memory configurator including a compressor to compress a data file comprising a plurality of page blocks; wherein the compressor is to compress the data file through removal of one or more page blocks from the plurality of page blocks matching one or more page block patterns; store an indicator in a compression map denoting retained page blocks and removed page blocks relative to the plurality of page blocks; and output a compressed data file comprising the retained page blocks and the compression map.

Example 10. The apparatus according to Example 9, wherein the compression map is a compression map of a compression table and wherein the compressor is to receive or obtain accesses to a data file comprising the plurality of page blocks, store the one or more page block patterns in a header of the compression table, for each page block in the plurality of page blocks, remove the removed page blocks when a then-current page block corresponds to the one or more page block patterns and retain the retained page blocks when the then-current page block does not correspond to the one or more page block patterns, and output the compressed data file comprising the retained page blocks and the compression table.

Example 11. The apparatus according to Example 10, wherein the header further comprises at least one of a user data, a signature, a globally unique identifier, an size of the data file, a page block size, or a length of a page block in the plurality of page blocks.

Example 12. The apparatus according to Example 9, wherein the compression map is a bit array, wherein bits in the bit array represent page blocks in the data file and wherein bit values of the bits in the bit array are the indicators.

Example 13. The apparatus according to Example 9, wherein the indicators indicate whether the then-current page block in the plurality of page blocks corresponds to the one or more page block patterns or is stored in the retained page blocks.

Example 14. The apparatus according to at least one of Example 9 to Example 13, wherein the one or more page block patterns comprises a page block common to at least two page blocks in the plurality of page blocks.

Example 15. The apparatus according to at least one of Example 9 to Example 13, wherein the compressor is to at least one of determine the one or more page block patterns by analysis of in the plurality of page blocks or obtain the one or more page block patterns from a user input.

Example 16. The apparatus according to at least one of Example 9 to Example 13, wherein the plurality of page blocks are to configure a computer device to control at least one of a serial peripheral interface, a device driver, a boot loader, or a kernel.

Example 17. The apparatus according to at least one of Example 9 to Example 13, wherein a decompressor is to decompress the compressed data file for a host process, kernel, or operating system.

Example 18. The apparatus according to at least one of Example 9 to Example 13, wherein a decompressor in a flash memory controller is to load the retained page blocks into a flash memory and is to return either a page block from the retained page blocks or a page block pattern in response to a request for at least a portion of the data file.

Example 19. The apparatus according to at least one of Example 9 to Example 13, wherein apparatus is a first apparatus and wherein the first apparatus is to make the compressed data file available to a second apparatus.

Example 20. An computer implemented method for computing, comprising: with a flash memory controller and a flash memory comprising a plurality of page blocks, receiving a request for a responsive page block and, in response thereto, accessing a compression map and one or more page block patterns, wherein the compression map comprises a set of indicators, wherein indicators in the set of indicators denote whether a responsive page block corresponds to the one or more page block patterns or a page block in the plurality of page blocks; and with the flash memory controller, returning the responsive page block either from the one or more page block patterns or the page block in the plurality of page blocks.

Example 21. The method according to Example 20, wherein the responsive page block is to configure at least one of a serial peripheral interface, a device driver, a boot loader, or a kernel of a host system of the apparatus.

Example 22. The method according to Example 20, wherein the compression map is a bit array, wherein bits in the bit array represent page blocks in an uncompressed version of the plurality of blocks and wherein bit values of the bits in the bit array are the indicators.

Example 23. The method according to Example 20, wherein the flash memory controller is to load the compression map from a compressed data file into the flash memory controller and load the plurality of page blocks from the compressed data file into the flash memory.

Example 24. The method according to Example 20, wherein the compression map is a compression map of a compression table and wherein the compression table further comprises a header, wherein the header comprises the one or more page block patterns, and an address and size of the responsive page block, and wherein the one or more page block patterns is a pattern of a page block removed from a superset of page blocks comprising the plurality of page blocks.

Example 25. The method according to at least one of Example 20 to Example 24, wherein the flash memory is a NOR flash memory.

Example 26. The method according to at least one of Example 20 to Example 24, wherein the flash memory controller is of a platform control hub.

Example 27. The method according to at least one of Example 20 to Example 24, wherein the request is by a host system, kernel, or operating system of the apparatus.

Example 28. An apparatus for computing, comprising: with a flash memory controller, means to receive a request for a responsive page block and, in response thereto, access a compression map and one or more page block patterns, wherein the compression map comprises a set of indicators, wherein indicators in the set of indicators denote whether a responsive page block corresponds to the one or more page block patterns or a page block in a plurality of page blocks in a flash memory; and with the flash memory controller, means to return the responsive page block either from the one or more page block patterns or the page block in the plurality of page blocks.

Example 29. The apparatus according to Example 28, wherein the responsive page block is to configure at least one of a serial peripheral interface, a device driver, a boot loader, or a kernel of a host system of the apparatus.

Example 30. The apparatus according to Example 28, wherein the compression map is a bit array, wherein bits in the bit array represent page blocks in an uncompressed version of the plurality of blocks and wherein bit values of the bits in the bit array are the indicators.

Example 31. The apparatus according to Example 28, further comprising means to load the compression map from a compressed data file into the flash memory controller and means to load the plurality of page blocks from the compressed data file into the flash memory.

Example 32. The apparatus according to Example 28, wherein the compression map is a compression map of a compression table and wherein the compression table further comprises a header, wherein the header comprises the one or more page block patterns, and an address and size of the responsive page block, and wherein the one or more page block patterns is a pattern of a page block removed from a superset of page blocks comprising the plurality of page blocks.

Example 33. The apparatus according to at least one of Example 28 to Example 32, wherein the flash memory is a NOR flash memory.

Example 34. The apparatus according to at least one of Example 28 to Example 32, wherein the flash memory controller is of a platform control hub.

Example 35. The apparatus according to at least one of Example 28 to Example 32, wherein the request is by a host system, kernel, or operating system of the apparatus.

Example 36. One or more computer-readable media comprising instructions that cause a flash memory configurator, in response to execution of the instructions by the flash memory configurator, to: compress a data file comprising a plurality of page blocks; wherein to compress the data file comprises: remove one or more page blocks from the plurality of page blocks matching one or more page block patterns; store an indicator in a compression map denoting retained page blocks and removed page blocks relative to the plurality of page blocks; and output a compressed data file comprising the retained page blocks and the compression map.

Example 37. The computer-readable media according to Example 36, wherein the compression map is a compression map of a compression table and wherein the instructions are further to cause the flash memory configurator to receive or obtain accesses to a data file comprising the plurality of page blocks, store the one or more page block patterns in a header of the compression table, for each page block in the plurality of page blocks, remove the removed page blocks when a then-current page block corresponds to the one or more page block patterns and retain the retained page blocks when the then-current page block does not correspond to the one or more page block patterns, and output the compressed data file comprising the retained page blocks and the compression table.

Example 38. The computer-readable media according to Example 37, wherein the header further comprises at least one of a user data, a signature, a globally unique identifier, an size of the data file, a page block size, or a length of a page block in the plurality of page blocks.

Example 39. The computer-readable media according to Example 36, wherein the compression map is a bit array, wherein bits in the bit array represent page blocks in the data file and wherein bit values of the bits in the bit array are the indicators.

Example 40. The computer-readable media according to Example 36, wherein the indicators indicate whether the then-current page block in the plurality of page blocks corresponds to the one or more page block patterns or is stored in the retained page blocks.

Example 41. The computer-readable media according to at least one of Example 36 to Example 40, wherein the one or more page block patterns comprises a page block common to at least two page blocks in the plurality of page blocks.

Example 42. The computer-readable media according to at least one of Example 36 to Example 40, wherein the instructions are further to cause the flash memory configurator to at least one of determine the one or more page block patterns by analysis of in the plurality of page blocks or obtain the one or more page block patterns from a user input.

Example 43. The computer-readable media according to at least one of Example 36 to Example 40, wherein the plurality of page blocks are to configure a computer device to control at least one of a serial peripheral interface, a device driver, a boot loader, or a kernel.

Example 44. The computer-readable media according to at least one of Example 36 to Example 40, wherein the flash memory configurator is of a first apparatus and wherein the flash memory configurator is to make the compressed data file available to a second apparatus.

What is claimed is:

1. One or more non-transitory computer-readable media comprising instructions that cause a flash memory controller, in response to execution of the instructions by the flash memory controller, to:
    compress an uncompressed data file comprising a plurality of uncompressed page blocks;
    wherein to compress the uncompressed data file comprises:
        store one or more of the uncompressed page blocks not matching one or more page block patterns into a compressed data file;
        exclude one or more of the uncompressed page blocks matching one or more page block patterns from the compressed data file;
        create a compression map in the compressed data file;
        store an indicator in a compression map denoting whether the uncompressed page blocks of the uncompressed data file correspond to the one or more page block patterns or uncompressed page blocks relative in the compressed data file; and
        output the compressed data file comprising the stored uncompressed page blocks, the one or more page block patterns, and the compression map.

2. The non-transitory computer-readable media according to claim 1, wherein the compression map is a compression map of a compression table of the compressed data file and wherein the instructions are further to cause the flash memory controller to receive or obtain accesses to the uncompressed data file comprising the plurality of uncompressed page blocks, store the one or more page block patterns in a header of the compression table, and wherein for each uncompressed page block in the plurality of uncompressed page blocks, exclude the particular uncompressed page blocks when the particular uncompressed page block corresponds to the one or more page block patterns and include the particular uncompressed page block when particular uncompressed page block does not correspond to the one or more page block patterns, and output the compressed data file comprising the included uncompressed page blocks and the compression table.

3. The non-transitory computer-readable media according to claim 2, wherein the header further comprises at least one of a user data, a signature, a globally unique identifier, a size of the data file, a page block size, or a length of a page block in the plurality of page blocks.

4. The non-transitory computer-readable media according to claim 1, wherein the compression map is a bit array, wherein bits in the bit array represent uncompressed page blocks in the uncompressed data file and wherein bit values of the bits in the bit array are the indicators.

5. The non-transitory computer-readable media according to claim 1, wherein the indicators indicate whether the uncompressed page blocks of the uncompressed data file correspond to the one or more page block patterns or the stored in uncompressed page blocks in the compressed file.

6. The non-transitory computer-readable media according to claim 1, wherein the instructions are further to cause the flash memory controller to at least one of determine the one or more page block patterns by analysis of thme plurality of uncompressed page blocks of the uncompressed data file or obtain the one or more page block patterns from a user input.

7. The non-transitory computer-readable media according to claim 1, wherein the flash memory controller is of a first apparatus and wherein the flash memory controller is to make the compressed data file available to a second apparatus.

8. An apparatus for computing, comprising:
a flash memory controller including a compressor to compress an uncompressed data file comprising a plurality of uncompressed page blocks to generate a compressed data file that is a compressed version of the uncompressed data file; wherein
the compressor is to compress the uncompressed data file through inclusion with the compressed data file of a subset of the one or more uncompressed page blocks from the plurality of uncompressed page blocks that do not match one or more page block patterns, excluding one or more of the uncompressed page blocks matching the one or more page block patterns; creation of a compression map in the compressed data file; storage of one or more indicators in the compression map to denote the included uncompressed page blocks and the removed uncompressed page blocks; and output the compressed data file comprising the retained included uncompressed page blocks, the one or more page block patterns, and the compression map.

9. The apparatus according to claim 8, wherein creation of the compression map comprises creation of a compression table in the compressed data file, and creation of the compression map as part of the compression table of the compressed data file; and wherein the compressor is to receive or obtain accesses to the uncompressed data file comprising the plurality of uncompressed page blocks, store the one or more page block patterns in a header of the compression table of the compressed data file, and wherein for each uncompressed page block in the plurality of uncompressed page blocks of the uncompressed data file, exclude the particular uncompressed page block from the compressed data file when the particular uncompressed page block corresponds to the one or more page block patterns and include the particular uncompressed page block in the compressed data file when the particular uncompressed page block does not correspond to the one or more page block patterns, and output the compressed data file comprising the included uncompressed page blocks and the compression table.

10. The apparatus according to claim 8, wherein the compression map is a bit array, wherein bits in the bit array represent the uncompressed page blocks in the uncompressed data file, wherein bit values of the bits in the bit array are the indicators, and wherein the indicators indicate whether the uncompressed page blocks correspond to the one or more page block patterns or the included uncompressed page blocks.

11. The apparatus according to claim 8, wherein the compressor is to at least one of determine the one or more page block patterns by analysis of the plurality of uncompressed page blocks of the uncompressed data file, or obtain the one or more page block patterns from a user input.

12. The apparatus according to claim 8, wherein apparatus is a first apparatus and wherein the first apparatus is to make the compressed data file available to a second apparatus.

13. An apparatus for computing, comprising:
a flash memory having one or more regions for storing one or more compressed data files that are compressed versions of one or more uncompressed data files, wherein each uncompressed data file has a plurality of uncompressed page blocks, and each compressed data file has a header having one or more page block patterns, a subset of the uncompressed page blocks of the corresponding uncompressed data file, and a compression map having a plurality of indicators respectively indicating whether corresponding uncompressed page blocks of the corresponding uncompressed data file of the particular compressed data file is included in the subset of uncompressed page blocks in the particular compressed data file; and
a flash memory controller comprising a decompressor, wherein the decompressor is to receive a request for an uncompressed page block of a first of the one or more uncompressed data files, and return the requested uncompressed page block either from the one or more page block patterns or the subset of uncompressed page blocks included in a first of the one or more compressed data files that is the compressed version of the first uncompressed data file, according to the compression map of the first compressed data file.

14. The apparatus according to claim 13, wherein the requested uncompressed page block of the first uncompressed data file is to configure at least one of a serial peripheral interface, a device driver, a boot loader, or a kernel of a host system of the apparatus.

15. The apparatus according to claim 13, wherein each compression map of a compressed data file is a bit array, wherein bits in the bit array represent the uncompressed page blocks of the corresponding uncompressed data file, wherein bit values of the bits in the bit array are indicators, and wherein the compression map and the header of the compressed version of the particular uncompressed data file forms a compression table of the compressed data file that is the compressed version of the particular uncompressed data file.

16. The apparatus according to claim 13, wherein the flash memory controller is to load the compression map of the first compressed data file into the flash memory controller and load the requested uncompressed page block of the first uncompressed data file from the first compressed data file into the flash memory.

17. A computer implemented method for computing, comprising:
with a flash memory controller and a flash memory comprising one or more regions for storing one or more compressed data files that are compressed versions of one or more uncompressed data files, receiving a request for an uncompressed page block of a first of the one or more uncompressed data files, each uncompressed data file having a plurality of uncompressed page blocks and, in response thereto, accessing a compression map and one or more page block patterns in the compressed data file of the first uncompressed data file, wherein the compression map comprises a set of indicators, wherein indicators in the set of indicators denote whether uncompressed page blocks of the first uncompressed data file corresponds to the one or more page block patterns or uncompressed page blocks in the compressed data file of the first uncompressed data file; and
with the flash memory controller, returning the requested uncompressed page block either from the one or more page block patterns or the uncompressed page blocks in the compressed data file of the first uncompressed data file.

18. The method according to claim 17, wherein the compression map is a bit array, wherein bits in the bit array represent uncompressed page blocks in the first uncompressed data file, and wherein bit values of the bits in the bit array are the indicators, wherein the compression map is a compression map of a compression table in the compressed data file of the first uncompressed data file, and wherein the compression table further comprises a header, wherein the header comprises the one or more page block patterns.

19. The method according to claim 17, further comprising loading the compression map from the compressed data file of the first uncompressed data file into the flash memory controller and loading the uncompressed page blocks in the compressed data file of the first uncompressed data file into the flash memory.

20. The method according to claim 17, wherein receiving comprises receiving the request from a host system, kernel, or operating system.

21. A non-transitory computer-readable medium (CRM) having a plurality of instructions stored therein, to cause a flash memory controller, in response to execution of the instructions by the flash memory controller, to:
  receive a request for an uncompressed page block of an uncompressed data file having a compressed data file that is a compressed version of the uncompressed data file stored in a flash memory controlled by the flash memory controller, and, in response thereto, access a compression map and one or more page block patterns in the compressed file, wherein the compression map comprises a set of indicators, wherein indicators in the set of indicators denote whether compressed page blocks of the uncompressed data file correspond to the one or more page block patterns or uncompressed page blocks in the compressed data file; and
  return the requested uncompressed page block either from the one or more page block patterns or the uncompressed page blocks in the compressed data file.

22. The CRM according to claim 21, wherein the compression map is a bit array, wherein bits in the bit array represent the uncompressed page blocks of the uncompressed data file, and wherein bit values of the bits in the bit array are the indicators.

23. The CRM according to claim 21, wherein the flash memory controller is further caused to load the compression map into the flash memory controller and the plurality of uncompressed page blocks in the compressed data file into the flash memory.

24. The CRM according to claim 21, wherein the compression map is a compression map of a compression table of the compressed file and wherein the compression table further comprises a header, wherein the header comprises the one or more page block patterns.

25. The CRM according to claim 21, wherein the flash memory controller is further caused to receive the request from a host system, kernel, or operating system of the apparatus.

* * * * *

UNITED STATES PATENT AND TRADEMARK OFFICE
CERTIFICATE OF CORRECTION

PATENT NO. : 10,970,206 B2
APPLICATION NO. : 16/473207
DATED : April 6, 2021
INVENTOR(S) : Fumin Lu et al.

Page 1 of 1

It is certified that error appears in the above-identified patent and that said Letters Patent is hereby corrected as shown below:

In the Claims

Column 16
Line 67, Claim 6: "...thme..." should read – "...the..."

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*